May 5, 1953　　　　　R. H. GARDNER　　　　　2,637,267
　　　　　　　　　　　　ELECTRIC TOASTER

Filed Jan. 6, 1949　　　　　　　　　　　　　　4 Sheets-Sheet 1

INVENTOR.
Roland H. Gardner
BY
Harry S. Ducasse
ATTORNEY.

INVENTOR.
Roland H. Gardner
BY Harry S. Dumarre
ATTORNEY.

May 5, 1953 R. H. GARDNER 2,637,267
ELECTRIC TOASTER
Filed Jan. 6, 1949 4 Sheets-Sheet 3

INVENTOR.
Roland H. Gardner
BY
Harry S. Dumarsr
ATTORNEY.

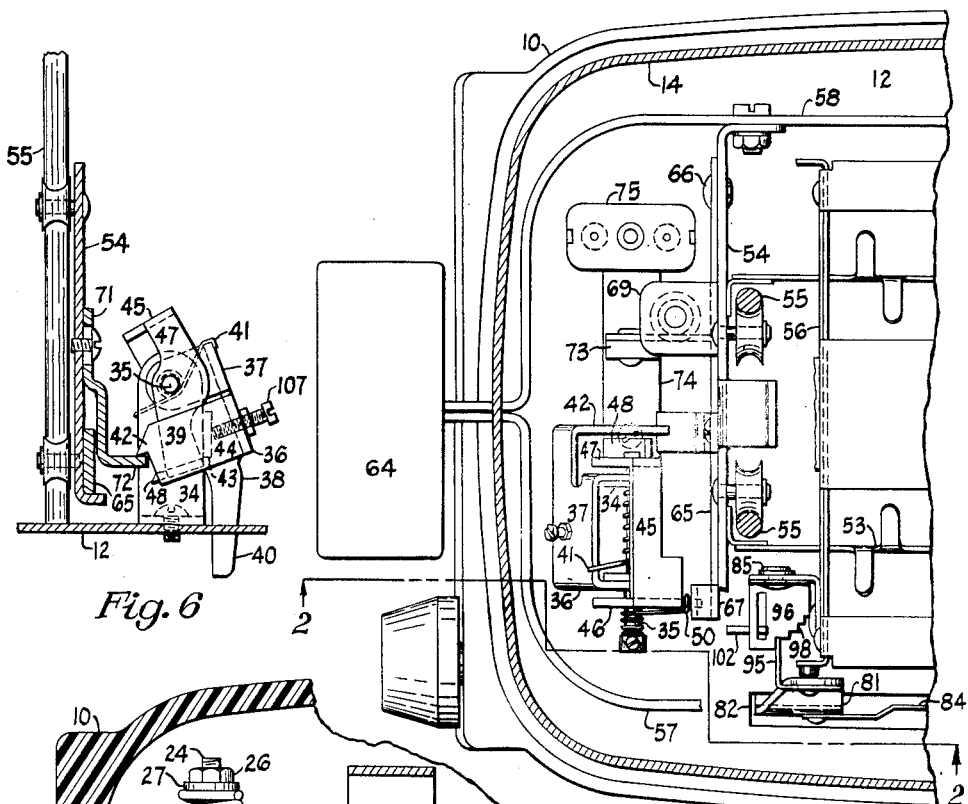
Fig. 6
Fig. 4
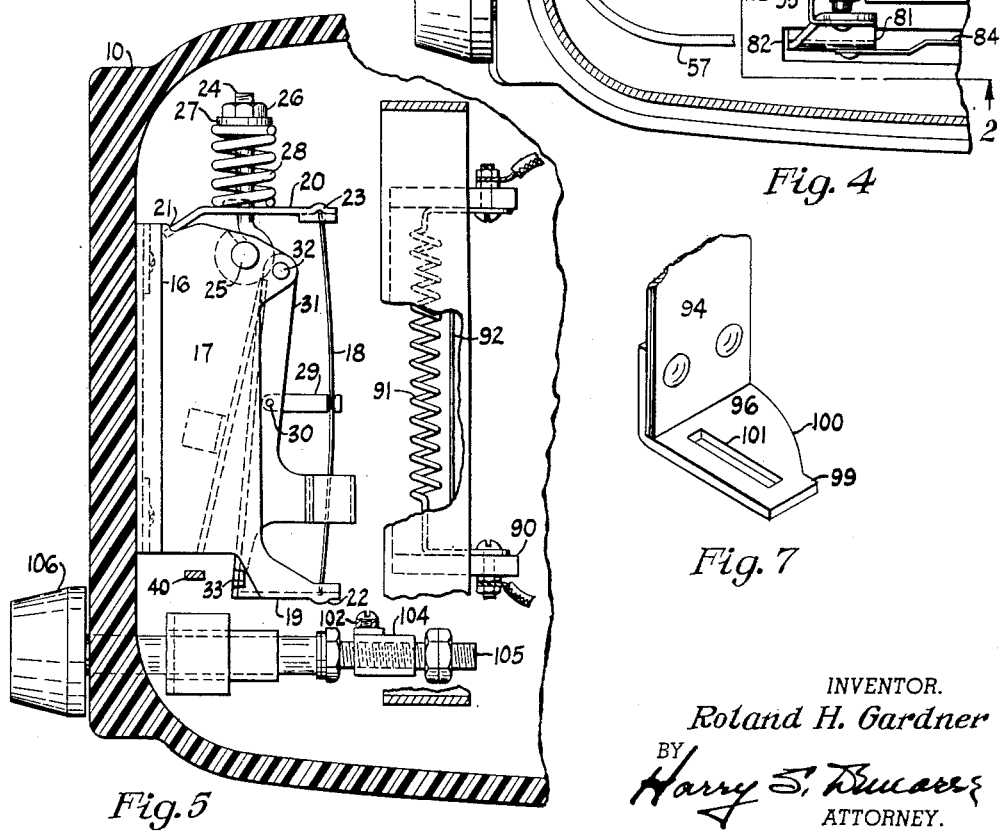
Fig. 5
Fig. 7
INVENTOR.
Roland H. Gardner
BY
Harry S. Duncan
ATTORNEY.

Patented May 5, 1953

2,637,267

UNITED STATES PATENT OFFICE 2,637,267

ELECTRIC TOASTER

Roland H. Gardner, North Canton, Ohio, assignor to The Hoover Company, North Canton, Ohio, a corporation of Ohio Application January 6, 1949, Serial No. 69,501

8 Claims. (Cl. 99—329)

This application relates to toasters and more particularly to a thermal timer therefor and specifically a thermal timer of the heat-up type in which the toasting intervals are timed by the time it takes for a thermally responsive element to be heated to a definite predetermined temperature.

Toaster timers of the thermal heat-up type are old in the art but have not been entirely satisfactory because of the difficulty in designing such a timer which will properly time a toasting interval starting with a cold toaster when both the timer and toasting oven are cold, and also properly time quickly following toasting operations when both the timer and toasting oven may be quite hot.

By experiment, it has been found that if a heat-up timer is properly designed to time a first toasting operation starting with a cold toaster the timer will act too quickly for toasting operations following closely upon the first, and that with succeeding quickly following toasting operations toast will be cooked progressively less and less.

Attempts have been made to overcome this tendency of a heat-up thermal timer to overcompensate by the provision of a secondary thermally responsive element to delay the operation of the main thermostatic element as the timer and toaster as a whole rises in temperature with rapid repeated use.

Those attempts have disclosed that it is unnecessary to change the operation of the timer as the toaster as a whole heats up during the first toasting operation and that for succeeding toasting operations, after the toaster has been heated up, it is necessary that the action of the timer be varied between or during succeeding toasting operations by means responsive to oven temperature in order to avoid the tendency of the heat-up thermal timers to over-compensate.

According to the present invention, the foregoing difficulties are overcome by means of a secondary thermally responsive element which is locked out of operation during the first toasting operation starting with a cold toaster, but which is operative between or during succeeding toasting operations to lengthen the timed interval over that which would otherwise result were the secondary thermostat not present.

According to one modification of the invention the secondary thermostat is locked out of operation during each toasting interval but is free to act between toasting operations. In this form of the invention the toasting interval is fixed at its initiation depending upon toaster temperature at that time and does not change during the toasting period regardless of changes in toaster temperature during that period.

According to a second modification of the invention the secondary thermally responsive element is locked out of operation only during the first toasting interval starting with the toaster cold. For subsequent toasting operations, or when the toaster is hot, the secondary thermally responsive element may change the operation of the timer during the toasting interval as the toaster temperature changes.

Other objects and advantages of this invention will become apparent as the description proceeds when taken in connection with the accompanying drawings in which:

Figure 4 is a plan view of the toaster of Fig. 1 on line 4—4 of Fig. 2;

Figure 5 is a view of the timer of Fig. 1 looking downwardly on line 5—5 of Fig. 2;

Figure 6 is a fragmentary view of the latch mechanism of Fig. 1 in one of its latching positions; and Figure 7 is a modification of the stop mechanism usable with the toaster of Fig. 1.

Figure 1:
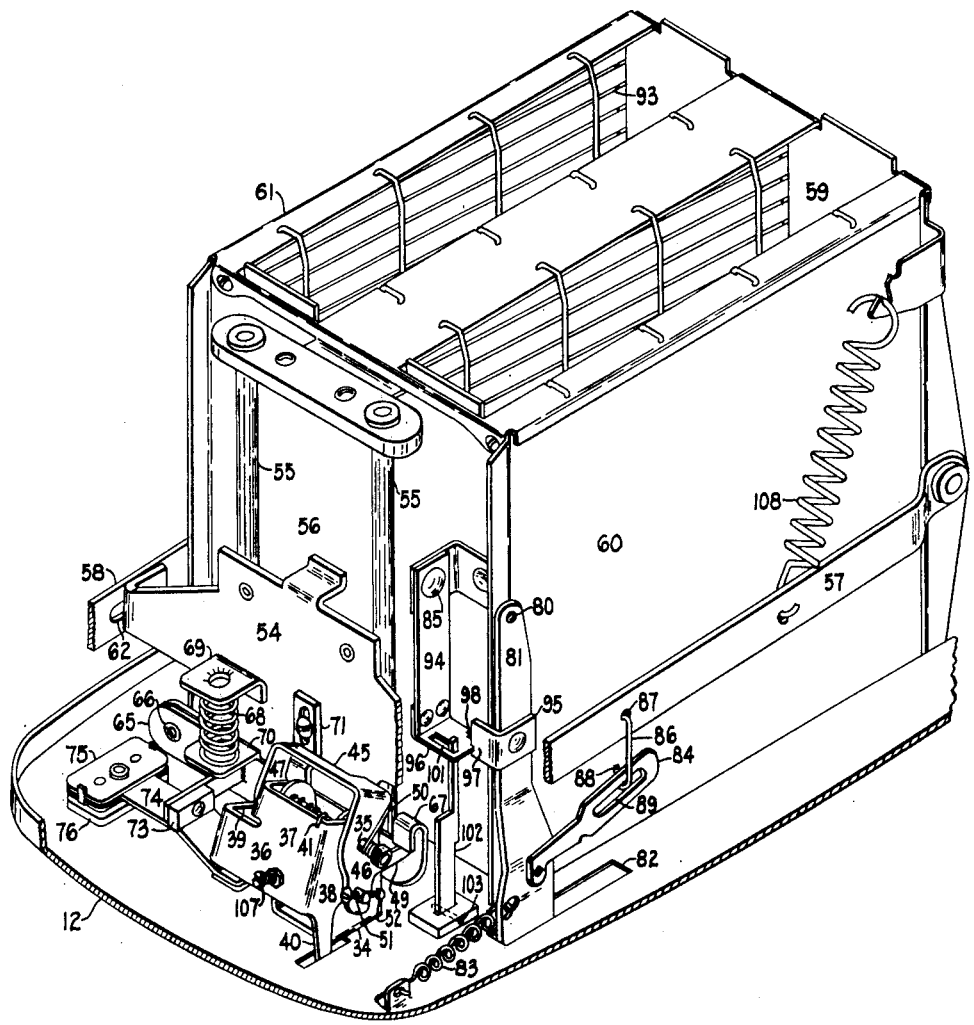
Figure 1 is a perspective view of the toaster of this invention.

This application is an improvement over my copending application, Serial No. 305,312, filed August 19, 1952, which application is a reissue application of my Patent 2,585,455 granted February 12, 1952, on an application Serial No. 789,867, filed December 5, 1947.

Referring to the drawings, the reference numeral 10 represents a base for the toaster of this invention which may be made of any suitable insulating material such as a phenolic condensation product or hard rubber. The base 10 has a ledge 11 upon which a supporting plate 12 is mounted and a second ledge 13 which receives the lower edge of an appearance housing 14 having bread receiving slots 15 in its top.

Attached to the front of the base 10 is a plate 16 which carries a frame, generally indicated by the reference numeral 17, upon which a bimetallic timer 18 is mounted. Frame 17 comprises a rigid end 19 (Fig. 5) and an end 20 pivoted to the frame 17 at 21. Ends 19 and 20 have recesses 22 and 23 respectively which receive the opposite ends of the time 18. An eye bolt 24 is pivoted to the frame 17 at 25 and extends through an opening in the pivoted end 20. The free end of the bolt 24 is threaded to receive a nut 26 acting against a follower 27 which contacts one end of a compression spring 28, its opposite end abutting against the pivoted end 20 of the frame 17. The nut 26 comprises a factory adjustment whereby the proper tension may be applied to the timer 18.

As shown in Fig. 5, one end of a link 29 is secured to the central portion of the timer 18, its opposite end being pivoted at 30 to an arm 31, one end of which is pivoted to the frame 17 at 32 and its opposite end carries a lug 33 which extends through an opening in the side of the frame 17 for a purpose which will be explained hereinafter.

Figure 2:
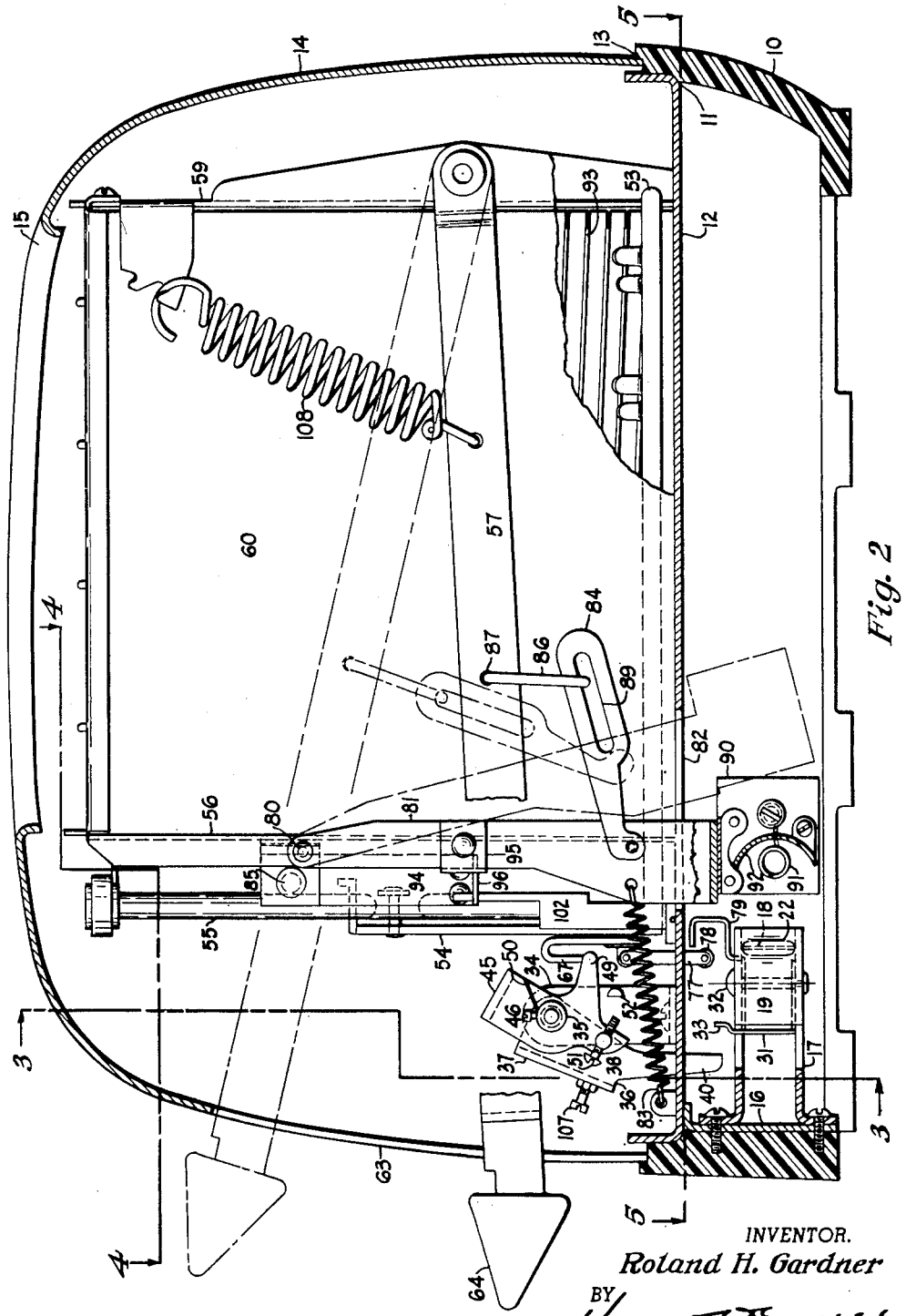
Figure 2 is a longitudinal cross-sectional view of the toaster of Fig. 1.

Supported on plate 12, above the frame 17, is a vertically extending U-shaped bracket 34 having its bight portion secured to the upper side of the supporting plate 12. Pivoted to a pin 35 extending through the upwardly extending legs of the bracket 34 is a latch lever generally indicated by the reference numeral 36. The latch lever 36 comprises a plate 37 connecting a pair of legs 38 and 39 having openings to receive the pin 35. The leg 39 is extended downwardly at 40 through an opening in the supporting plate 12 into a position in front of the lug 33 of the lever 31 as shown in Fig. 2. The leg 39 is extended outwardly at 44 and bent rearwardly to form a hook 42 (Fig. 6) positioned below the pivot pin 35. The latch lever 36 is biased clockwise as viewed in Fig. 6 (counterclockwise as viewed in Figs. 1 and 2) by a spring 41, the set screw 107 and plate 43 carried by the bracket 34 forming a stop.

Figure 3:
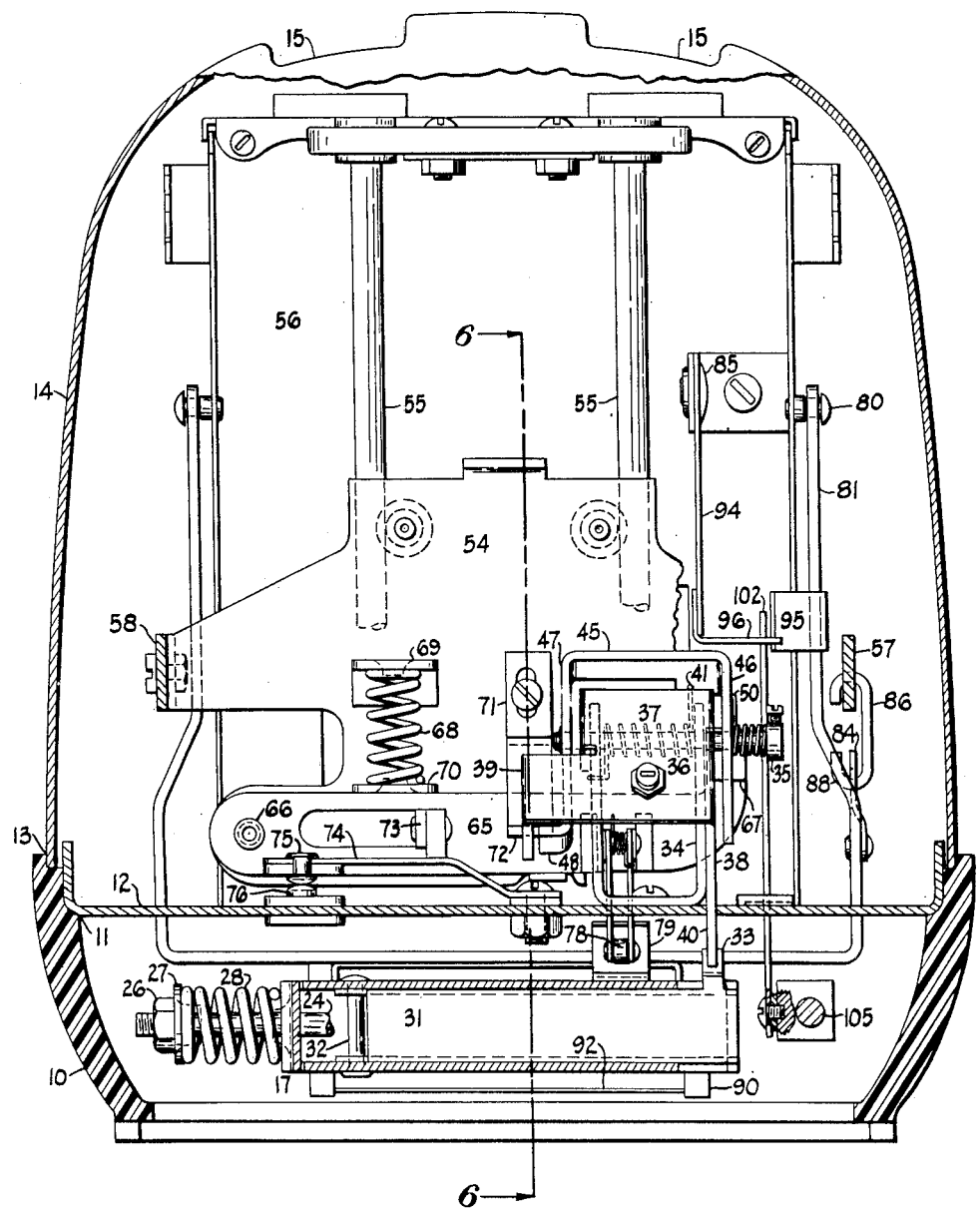
Figure 3 is a vertical sectional view of the toaster of Fig. 1 on line 3—3 of Fig. 2.

A second latch lever, generally indicated by the reference numeral 45, is also pivoted to the pin 35. The latch lever 45 is also of inverted U-shape and has a pair of legs 46 and 47 extending downwardly below the pivot pin 35. The leg 47 is extended laterally at 48 (Fig. 3) and the leg 46 has a lug 49 extending rearwardly toward the toasting oven as shown in Figs. 1 and 2. The latch lever 45 is also biased clockwise as viewed in Fig. 6, counterclockwise as viewed in Figs. 1 and 2 by a spring 50, the set screw 51 and lug 52 forming a stop.

A carriage plate 54 carrying bread racks 53 is mounted for vertical reciprocation on vertically extending guide rods 55. At their upper ends the guide rods 55 are secured to a bracket extending forwardly from the front wall 56 of the toasting oven while at their lower ends they are secured to the supporting plate 12. A pair of arms 57 and 58 are pivoted to the rear wall 59 of the toast oven and extend forwardly along its side walls 60 and 61. The arms 57 and 58 are secured to the carriage plate 54 by pins extending through slots 62 so that the carriage plate 54 can move vertically as the arms move about their pivots. At their forward ends the arms 57 and 58 are extended forwardly through a slot 63 in the appearance housing 14 to receive a manipulating handle 64. A tension spring 108 is anchored at its upper end to the rear oven wall 59 and its lower end to the arm 57 so as to normally hold the carriage plate 54 and its associated parts in their vertical position.

An arm 65 is pivoted at 66 to the carriage plate 54 and at its opposite end carries a reversely bent abutment 67 adapted to overlie the lug 49 of latch 45 under certain conditions to be explained hereinafter. The arm 65 is normally biased downwardly by a compression spring 68 acting between the lug 69 secured to the carriage plate 54 and a lug 70 carried by the arm 65. A latch lug 71 (Fig. 6) is secured to the carriage plate 54 above the arm 65 and has a portion 72 extending forwardly in front of the arm 65 to cooperate with the latches 36 and 45 in a manner which will be explained hereinafter.

Extending forwardly from the arms 65 is a lug 73 which cooperates with a spring arm 74 to press a bridging contact 75 against a pair of fixed contacts 76 carried by the supporting plate 12 in a manner which will be more fully explained hereinafter.

Freely pivoted to the arm 65 near its free end is a link 77 (Fig. 2) carrying a roller 78 adapted to overlie a return bent lug 79 carried by the lever 31 and extending through the upper side of the frame 17 and operating in a manner to be more fully explained hereinafter.

Pivoted to the front of the wall 56 at 80 is a downwardly extending arm 81 which extends downwardly through a slot 82 in the supporting plate 12. The arm 81 is normally biased forwardly by a tension spring 83 and is adapted to be moved rearwardly in a manner to be explained hereinafter by a link 84 pivoted to the arm 81 intermediate its ends and a link 86 pivoted to the arm 57 at 87 and having a return bend 88 at its opposite end positioned in a slot 89 in the link 84.

At its lower end the link 81 carries a frame 90 (Fig. 2) extending the full length of the timing bimetal 18. The frame 90 carries an auxiliary heater 91 and the reflector 92 which are positioned immediately in front of the bimetal 18 during timing operations as will more readily appear hereinafter. The auxiliary heater 91 is preferably connected in series with the main heaters 93 positioned in the toasting oven and in series with the fixed contacts 76.

Pivoted at 85 to the front oven wall 56 so as to be responsive to oven temperature is a compensating b.metal 94 which extends downwardly and faces toward an angle bracket 95 carried by the arm 81. The bimetal 94 is so made that its lower end bows toward the angle bracket 95 with rises in temperature. At its free end the bimetal 94 carries an angled member 96 which cooperates with the angle bracket 95 as will be hereinafter explained. The member 96 has its inner edge cut at an angle with a large notch 97 and a plurality of smaller notches 98 cut therein.

In the modification shown in Fig. 7 the angle member 96' has a notch 99 and a smooth cam surface 100 on its inner edge to coact with the angle bracket 95 as will be explained.

The member 96 is provided with a slot 101 which receives the upper end of the lever 102 pivoted to the supporting plate 12 at 103. At its lower end (Figs. 3 and 5) beneath the supporting plate 12 the lever 102 carries a nut 104 which cooperates with a threaded shaft 105 rotatably carried by the base 10 beneath the supporting plate 12. A manipulating knob 106 is positioned exteriorly of the base 10 for ready manual manipulation of the shaft 105.

*Operation*

Bread is inserted through the slots 15 so as to rest upon the racks 53. The carriage plate 54 is then moved downwardly against the bias of spring 108 by grasping the handle 64 and moving it downwardly. As the carriage plate 54 moves downwardly the lug 73 which extends forwardly from the arm 65 will engage the spring arm 74 and move the bridging contact 75 into contact with the fixed contacts 76 so as to simultaneously energize both the main heaters 93 and the auxiliary heater 91. The lug 72 carried by the carriage plate 54 will move beneath the hook 42 of the latch lever 36 so that the carriage plate 54 and the bread racks 53 will be latched in lowered position within the toasting oven.

Simultaneously, with the movement of the carriage plate 54 to downward position, arm 57 will be moved downwardly to permit the links 86 and 84 to collapse as shown in Fig. 1 and permit the spring 83 to move the arm 81 clockwise as viewed in Fig. 1 so as to bring the auxiliary heater 91 and reflector 92 immediately in front of the bimetallic timer 18 to a position determined by contact of the angle member 95 with the inner edge of angle 96. If the toaster is cold, the inner edge of the angle member 95 will engage in the notch 97 or in the notch 99 of Fig. 7 so that the position of the auxiliary heater 91 and reflector 92 relative to the timing bimetal 18 will be fixed for the first toasting operation.

Heat from the auxiliary heater 91 will be radiated directly to the bimetallic element 18 and also reflected thereto by the reflector 92. As the bimetal 18 heats up it will straighten out against the action of the spring 28 until it reaches its dead-center position when it will be snapped to an opposite bowed position from that shown in Fig. 5 by the action of spring 28. This movement will cause the arm 31 to be moved to the dotted line position of Fig. 5. The lug 33 will engage the lower end 40 of the latch lever 36 to move it counter-clockwise as viewed in Fig. 6 against the bias of the spring 41 and move the hook 42 from above the lug 72 whereby the spring 108 will move the carriage plate 54 and racks 53 upwardly and project the finished toast through the slots 15.

At the same time, movement of the arm 57 to its upward position will cause the links 84 and 86 to move to their dotted line positions shown in Fig. 2 so as to pivot the arm 81 counterclockwise and move the auxiliary heater 91 and reflector 92 away from the bimetal 18 so as to permit the bimetal 18 to quickly cool by air circulating upwardly over the frame 17 through the supporting plate 12 and upwardly through the toast oven. It has been found in practice that the bimetal 18 will cool so as to snap backwardly to its original position within just a few seconds after a timing interval is terminated.

As soon as the arm 81 is moved to the dotted line position of Fig. 2 the angle member 95 is moved out of contact with the notch 97 of angle member 96 and since the bimetal 94 has been heated considerably during the first toasting operation its lower end will bow outwardly so as to position the first of the smaller notches 98 in front of the inner edge of the angle member 95. In the modification of Fig. 7 the steeper portion of the cam 100 will be positioned in front of the inner edge of the angle member 95.

If a second toasting operation is begun immediately new bread will be inserted and the handle 94 moved downwardly as before to move the carriage plate 54 and its associated parts downwardly. If the bimetal 18 is still hot the lug 33 of arm 31 will still hold the latch arm 36, counterclockwise as viewed in Fig. 6 so that its hook 42 will not engage above the lug 72. Also the lug 79 of lever 31 will be positioned beneath the roller 78 so as to cause the link 77 to hold the arm 65 upwardly against the bias of the spring 68. This will prevent the shoulder 67 from coming into contact with the arm 49 of latch lever 45 so that the latch lever 45 will be held in its counterclockwise position as viewed in Fig. 1 against the stop 52 by the action of the spring 50. This will cause the projecting end 48 of the latch lever 45 to move over the lug 72 and latch the carriage plate 54 in downward position. It is to be noted, however, that neither the main heaters 93 nor the auxiliary heater 91 will be energized because the lug 73 of arm 65 is held out of contact with spring 74. However, the timer 18 will quickly cool due to its position beneath the supporting plate 12 isolated from all hot parts of the toaster and the fact that the natural air draft created by the heat of the oven will cause air to circulate upwardly thereover. In practice it has been found that the bimetal 18 will usually cool sufficiently fast to snap to its original position within 10 to 15 seconds after the termination of a toasting operation.

When the bimetallic time 18 snaps backwardly to its original position at a time when the carriage 54 is locked downwardly by latch 45, the lug 33 of lever 31 will be removed from contact with the lug 40 of latch 36 and the lug 79 will be simultaneously removed from beneath the roller 78 of link 77. That will permit the spring 41 to move the latch lever 36 clockwise as viewed in Fig. 6 to bring the hook 42 above the lug 72. The arm 65 will be simultaneously pivoted downwardly by the action of the spring 68 to bring the shoulder 67 into contact with the arm 49 of latch lever 45 to pivot it clockwise as viewed in Figs. 1 and 2 against the bias of spring 50 and remove the projection 48 from above the lug 72 of carriage 54 permitting it to move upwardly slightly under the bias of spring 106 until the lug 72 engages the hook 42 of latch lever 36. Simultaneously, the lug 73 of lever 65 engages spring arm 74 to force the bridging contact 75 downwardly against the spaced contacts 76 to simultaneously energize the main and auxiliary heaters 93 and 91 to initiate a second toasting operation.

The toasting oven also being hot when the second toasting operation was initiated as described, the second toasting interval should be shorter than the first. However, it has been found that thermal timers of the heat-up type have the tendency to over-compensate and progressively shorten the toasting intervals beyond that necessary after the first interval if the toaster is used in a rapid sequence of operation. This is due to the fact that the timer itself is also progressively hotter at the beginning of each successive toasting operation with the result that the bread becomes progressively underdone as the toasting operations proceed in rapid succession.

According to the present invention the compensating bimetal 94 is provided to prevent the toasting intervals from being shortened too much after the first. It is constructed so that it will be locked out of operation for the first toasting operation starting with a cold toaster, will lengthen the second operation to a maximum amount and thereafter progressively decrease the amount the operation is lengthened to the end that toast of uniform color may be produced regardless of how fast succeeding toasting operations are initiated.

After each toasting operation the arm 81 is pivoted backwardly so that the angle bracket 95 is moved away from contact with the member 96 freeing the bimetal 94 for outward movement of its lower end. In the case of the modification of Figs. 1 to 6, inclusive, a new one of the serrations 98 is moved in front of the angle bracket 95 for each succeeding toasting operation. In the case of the modification of Fig. 7 a new point on the cam surface 100 is moved in front of the angle bracket 95. In either case the compensating action of the compensating bimetal 94 is locked out for the first toasting operation, is at a maximum for the second and becomes progressively less for succeeding operations. In the case of the modification of Figs. 1 to 6, inclusive, the action of the compensating bimetal 94 is locked out during each operation while in the modification of Fig. 7 the action of the cam surface 100 moves the auxiliary heater 91 and reflector 92 away from the timer 18 during each toasting operation after the first. The cam 100 is so shaped that the increment of movement of the heater away from the bimetal 18 is greatest immediately after the first toasting operation.

As will be evident, movement of the lower end of the bimetallic element 94 outwardly will interrupt movement of the auxiliary heater 91 and reflector toward the timer 18 sooner than would otherwise be the case so that the auxiliary heater 91 will be positioned farther away from the timer 18 and thus lengthen the duration of toasting intervals over what they otherwise would be in response to rises in toaster temperature with rapid repeated use of the toaster.

The length of all toasting intervals may be varied manually in adjusting for preparing dark, medium, or light toast. According to the present invention this is superimposed upon the action of the compensating bimetal 94 so that the compensating bimetal will automatically compensate for rises in toaster temperature whether the manual control is set for light, medium, or dark toast.

In adjusting for light, medium, or dark toast the knob 106 is rotated in one direction or the other. The threaded shaft 105 and nut 104 may be threaded either right or left handed. In either case rotation of the knob 106 will pivot the lever 102 about its pivot 103 so as to pivot the bimetal 94 about its pivot 85 and change the relative position of the angle members 95 and 96 which in turn will change the final position of the auxiliary heater 91 and reflector 92 relative to the timing bimetal 18.

From the foregoing it can be seen that this invention provides a thermal timer for a toaster of the heat-up type with a compensating bimetal responsive to rises in oven temperature in which the compensating bimetal is locked out of action during the first toasting interval starting with the cold toaster and thereafter lengthens the toasting intervals, over that which they otherwise would be, a maximum increment for the second toasting interval and progressively shorter increments for succeeding toasting operations.

While I have shown but two modifications of my invention it is to be understood that those modifications are to be taken as illustrative only and not in a limiting sense. I do not wish to be limited to the specific structure shown and described but to include all equivalent variations thereof except as limited by the scope of the claims.

I claim:

1. A toaster comprising, a toasting oven, main heaters within said oven, a movable bread carrier within said oven, means for moving said carrier from a receiving position to a toasting position adjacent said heaters, a thermal timer for timing the duration of toasting intervals, an auxiliary heater for said timer, means activated as an incident to movement of said carrier to toasting position for moving said auxiliary heater toward said timer and for energizing said heaters, a movable stop positioned to limit the movement of said heater toward said timer, a compensating bimetal having a free end movable in response to changes in oven temperature, said stop being positioned to be moved by movement of the free end of said compensating bimetal, coacting stop means carried by said auxiliary heater moving means and coacting with said stop for preventing movement of said stop when said carrier is in its toasting position, said stop being mounted on the free end of said compensating bimetal and having a plurality of stepped serrations, at least one of which is movable into the path of said coacting stop means between toasting intervals and means actuated by movement of said thermal timer operable to deenergize said main heaters.

2. A toaster comprising, a base, a supporting plate mounted on said base, a toasting oven supported on top of said plate, main heaters in said oven, a bread carrier within said oven mounted for movement from a bread receiving position to a toasting position adjacent said heaters and being spring-biased to receiving position, a thermal timer carried by said base beneath said supporting plate forwardly of said oven, an arm pivoted to said oven at its upper end and having its lower end extending downwardly below said plate to a position rearwardly of said timer and being spring-biased toward said timer, an auxiliary heater carried by the lower end of said arm, carrier moving means for moving said carrier from receiving to toasting position, linkage means connecting said arm to said carrier moving means, the arrangement being such that said auxiliary heater is held away from said timer when said carriage is in receiving position and is released for movement toward said timer when said carriage is moved to toasting position, a compensating bimetal attached to said oven at its upper end and extending downwardly in parallel relationship to said arm, said compensating bimetal being constructed to bow toward said arm with rises in oven temperature and a stop carried by the lower end of said compensating bimetal and extending into the path of movement of said arm, said stop having a sloped edge permitting more or less movement of said arm depending upon the temperature of said oven, means for energizing said heaters to initiate a toasting operation and means actuated by movement of said thermal timer operable to deenergize said main heaters.

3. A toaster according to claim 2 in which said stop has a notch so related to said arm as to prevent movement of said stop by said compensating bimetal during toasting intervals which are initiated when the oven is cold.

4. A toaster comprising, a base, a supporting plate carried by said base, a toasting oven supported on the top of said plate, a thermal timer supported by said base underneath said plate in front of said oven, an auxiliary heater for said timer supported for movement toward and away from said timer to the rear thereof, a bread carriage in said oven movable from a loading position to a toasting position, manual means for moving said carriage from loading to toasting position, means coacting between said manual means and said auxiliary heater for moving it away from said timer when said carriage moves to its loading position and returning it toward said timer when said carriage is moved to its toasting position, a compensating bimetal element having one end fixedly secured to a wall of said oven and a free end, a stop carried by the free end of said compensating bimetal for limiting the movement of said heater toward said timer, said stop being so shaped as to vary the final position of said heater relative to said timer with variations in oven temperature, means actuated by movement of said carriage to toasting position operable to initiate toasting operations and means actuated by movement of said thermal timer operable to terminate toasting operations.

5. A toaster according to claim 4 in which said stop is so shaped and arranged relative to the supporting means for said auxiliary heater that said bimetallic element is locked out of action when said carriage is in toasting position.

6. A toaster comprising, a base, a supporting plate carried by said base, a toasting oven supported on top of said plate, an elongated thermal timer supported beneath said plate forwardly of said oven, an arm pivoted at its upper end to the front wall of said oven and having its lower end extending below said plate rearwardly of said timer, an auxiliary heater for said timer carried by the lower end of said arm and extending lengthwise of said timer rearwardly thereof, a bimetallic strip pivoted at its upper end to the front wall of said oven and extending downwardly in substantial parallel relationship to said arm for pivotal movement in a plane parallel to the plane of movement of said arm, a stop carried by the lower end of said strip and extending into the path of movement of said arm to limit forward movement of said arm, of said heater toward said timer and manually actuatable means engaging said stop for pivoting said strip so as to move said stop forwardly and rearwardly relative to said arm in adjusting the toaster for preparing light, medium, or dark toast, means for initiating toasting operations and simultaneously moving said arm against said stop and means actuated by movement of said thermal timer operable to terminate toasting operations.

7. A toaster according to claim 6 in which said strip, stop, and arm are so constructed and arranged as to increasingly limit the forward movement of said arm and heater toward said timer as the temperature of said oven rises.

8. A toaster according to claim 7 further characterized in that said stop is so shaped and related to said arm that said stop is locked against movement during toasting intervals.

ROLAND H. GARDNER.

References Cited in the file of this patent

UNITED STATES PATENTS

| Number | Name | Date |
| --- | --- | --- |
| 2,101,062 | Graham | Dec. 7, 1937 |
| 2,167,121 | McCreary et al. | July 25, 1939 |
| 2,196,394 | Ireland | Apr. 9, 1940 |
| 2,207,947 | Sardeson | July 16, 1940 |
| 2,271,520 | Strauss | Feb. 3, 1942 |
| 2,294,695 | Sardeson | Sept. 1, 1942 |
| 2,362,753 | Huck | Nov. 14, 1944 |
| 2,426,620 | Koci | Sept. 2, 1947 |
| 2,436,735 | Walder et al. | Feb. 24, 1948 |
| 2,508,464 | McCullough | May 23, 1950 |
| 2,557,512 | Padelford | June 19, 1951 |
| 2,558,199 | Scharf | June 26, 1951 |
| 2,585,455 | Gardner | Feb. 12, 1952 |
| 2,585,466 | Humphrey et al. | Feb. 12, 1952 |